(12) United States Patent
Alferyev et al.

(10) Patent No.: US 8,900,361 B2
(45) Date of Patent: Dec. 2, 2014

(54) THERMOINSULATIVE AND THERMOCONDUCTIVE CONCRETES BASED ON AN ALUMINOPHOSPHATE BINDER (VARIANTS)

(71) Applicants: Sergey D. Alferyev, Seversk (RU); Valeriy A. Polyakov, Tomsk (RU)

(72) Inventors: Sergey D. Alferyev, Seversk (RU); Valeriy A. Polyakov, Tomsk (RU)

(73) Assignee: Zao Pikkerama, Novosibirsk (RU)

( * ) Notice: Subject to any disclaimer, the term of this patent is extended or adjusted under 35 U.S.C. 154(b) by 0 days.

(21) Appl. No.: 14/046,967

(22) Filed: Oct. 5, 2013

(65) Prior Publication Data

US 2014/0175323 A1    Jun. 26, 2014

(51) Int. Cl.
*C04B 28/34* (2006.01)
*C04B 12/02* (2006.01)

(52) U.S. Cl.
CPC .................................. *C04B 28/342* (2013.01)
USPC ....................................................... 106/691

(58) Field of Classification Search
USPC ........................................................ 106/691
See application file for complete search history.

(56) References Cited

FOREIGN PATENT DOCUMENTS

| RU | 2365561 C1 | * | 8/2009 |
|---|---|---|---|
| RU | 2365562 C2 | * | 8/2009 |
| SU | 313820 A | * | 11/1971 |
| SU | 466272 A | * | 6/1975 |
| SU | 499240 A | * | 4/1976 |
| SU | 560859 A | * | 8/1977 |
| SU | 576300 A | * | 10/1977 |
| SU | 626079 A | * | 8/1978 |
| SU | 628121 A | * | 8/1978 |
| SU | 697452 A | * | 11/1979 |
| SU | 730660 A | * | 5/1980 |
| SU | 863551 B | * | 9/1981 |
| SU | 943214 B | * | 7/1982 |
| SU | 945142 B | * | 7/1982 |
| SU | 1807982 A3 | * | 4/1993 |

* cited by examiner

*Primary Examiner* — Anthony J Green
(74) *Attorney, Agent, or Firm* — Inventa Capital PLC

(57) ABSTRACT

The group of inventions relates to the refractory materials industry, in particular to the production of refractory high-strength nonconductive articles of corundum and silicon carbide concretes on an aluminophosphate binder. The objective of the proposed group of inventions is to provide shaped thermoinsulative and thermoconductive concretes based on an aluminophosphate binder with high strength characteristics, enabling the concretes to be used as building and construction materials operating at high temperatures. According to the first variant, the thermoinsulative concrete based on an aluminophosphate binder includes a phosphate binder and a mixture, wherein orthophosphoric acid is used in a concentration of 65-75% as phosphate binder and a mixture of different fractions of 25A grade electrocorundum is used as the mixture. According to the second variant, the thermoconductive concrete based on an aluminophosphate binder comprises a phosphate binder and a mixture, wherein orthophosphoric acid in a concentration of 65-75% is used as phosphate binder, a mixture of 25A grade electrocorundum of 220 fraction and a mixture of 53C grade silicon carbide is used as an additional mixture. The technical result is high strength characteristics, enabling the concretes to be used as building and construction materials operating at high temperatures.

2 Claims, No Drawings

THERMOINSULATIVE AND THERMOCONDUCTIVE CONCRETES BASED ON AN ALUMINOPHOSPHATE BINDER (VARIANTS)

RELATED APPLICATIONS

This application claims priority to Patent Cooperation Treaty Application number PCT/RU2012/000237, filed on Apr. 5, 2011, and incorporated herewith by reference in its entirety.

FIELD OF THE INVENTION

The group of inventions relates to the refractory industry, in particular to the production of refractory high-strength non-electrically conducting articles of corundum and silicon carbide concretes on an aluminophosphate binder.

BACKGROUND OF THE INVENTION

Patent of the Russian Federation No. 2365561 of Dec. 11, 2007, published on Aug. 27, 2009, IPC C04B35/10, describes the following composition. A body for producing refractory thermoinsulative materials and products comprises a binder based on aluminophosphates and the charge mixture in the form of a mixture of refractory filler material selected from the group consisting of alumina and aluminosilicates and one or two complex oxides of magnesium, iron, silicon, and aluminum (vermiculite, perlite) selected from the group with the following mixing ratio, % wt: charge mixture—35-85; phosphate suspension—15-65. Aluminoboronphosphate-based binder or aluminochromephosphate-based binder with aluminosilicate refractory filler of 0.125-0 mm fraction amounting to 0.1-15% from the suspension weight with the following mixing ratio of the charge: for a mixture of refractory filler with perlite, weight fractions are 1.0 and 0.04-4.0, respectively; for a mixture of refractory filler with vermiculite, weight fractions are 1.0 and 0.05-2.5, respectively; for a mixture of refractory filler with perlite and vermiculite, the weight fractions are 1.0—for filler, 3.95-0.05 for perlite, and 0.05-2.45 for vermiculite.

Disadvantages of the Composition:
- When firing the mixture, aluminophosphate-based binder always emits low-temperature materials, such as chrome, boron, leading to contamination of products and lining;
- Aluminum silicates and aluminum oxides belong to different groups in terms of chemical reaction with phosphate binders and dramatically reduce the performance of the resulting crystalline aluminum orthophosphate in the form of a binder.

Patent of the Russian Federation No. 2365562 of Jul. 13, 2007, published on Aug. 27, 2009, IPC C04B35/66, C04B35/103, describes the following composition. The refractory material composition contains the following % wt: graphite 5÷8; phosphate plasticizer 5÷10; grained refractory particulate filler from the white fused alumina group, fireclay with grain size of less than 63 μm 4÷25; organic fibers 0.05÷0.15; waste products of carbon ferrochrome 2÷6; particulate filler from the white fused alumina group, silicon carbide, or fireclay with grain size of 6÷0.5 mm constitute the rest.

The refractory mixture has the following disadvantages. The presence of graphite and organic fibers that increase the mixture porosity in the subsequent firing substantially reduces homogeneity of the mixture because of the different density compared to the filler material. During firing of the mixture, its combustion waste pollutes and increases thermal and electrical conductivity.

Particulate filler composition comprised of electrocorundum, silicon carbides, and aluminosilicates cannot be homogenised at the required fire resistance, thermal conductivity, and strength characteristics.

Patent of the Russian Federation No. 2245864 of Jul. 9, 2003, published on Feb. 10, 2005, IPC C04B35/106, describes the following composition which was selected as a prototype for this study. In preparation of the charge, the surface of spheroid particles of electrocorundum filler is wetted out with oleic or stearic acid in an amount of 0.5-1.0% of the total amount of phosphate binder. During mixing, phosphate binder and finely-divided intergrinding mixture containing the following components, % wt: $Al_2O_3$—47-80 $ZrO_2$—$SiO_2$—20-53, are incorporated discretely, with the following components in the charge mixture, % wt:

Electrocorundum filler—50-70
Finely-divided intergrinding mixture—30-50
Phosphate binder in addition to 100% 5-10.

The blank parts are air-hardened and the charge mixture is homogenized, shaped, fired at a temperature of zircon concentrate decomposition, and cooled during isothermal holding in the temperature range of 1100-900° C. A fractional composition of electrocorundum filler is in the range of 0.1-3 mm. The particle size of the finely-divided intergrinding mixture is 0.002-0.005 mm. Phosphoric acid is used as a phosphate binder.

Disadvantages of the Composition:
The presence of finely-divided aggregate in the form of $ZrO_2$—$SiO_2$ which is neutral to phosphoric acid dramatically reduces the strength.

DETAILED DESCRIPTION OF THE INVENTION

The objective of the proposed group of inventions is to provide shaped thermoinsulative and thermoconductive concretes on an aluminophosphate binder with high strength characteristics, enabling the concretes to be used as building and construction materials operating at high temperatures.

The technical result is high strength characteristics, enabling the concretes to be used as building and construction materials operating at high temperatures.

The stated objective is achieved by using the thermoinsulative concrete on an aluminophosphate binder which includes a phosphate binder and a mixture, according to the first variant. Orthophosphoric acid is used in a concentration of 65-75% as phosphate binder, and a mixture of different fractions of 25A grade electrocorundum is used as the mixture with the following mixing ratio of the components, according to FEPA 32 GB 1971, % wt:

for corundum thermoinsulative concrete, the following composition is used, according to FEPA 32 GB 1971, % wt:
25A grade electrocorundum—28-36% wt of 20 fraction
22-24% wt of 46 fraction
15-20% wt of 80 fraction
25-35% wt of 220 fraction
Orthophosphoric acid with a concentration of 70%, amounting to 10-12 in addition to 100% wt.
25A grade electrocorundum—particle range (μm) 630-1600, main 1000-1250, FEPA compliant—F20.
25A grade electrocorundum—particle range (μm) 200-500, main 315-400, FEPA compliant—F46.
25A grade electrocorundum—particle range (μm) 100-250, main 160-200, FEPA compliant-F80.

25A grade electrocorundum—particle range (μm) 28-80, main 50-63, FEPA compliant—F220.

The stated objective is achieved by using the thermconductive concrete based on an aluminophosphate binder which includes a phosphate binder and a mixture, according to the second variant. Orthophosphoric acid with a concentration of 65-75% is used as phosphate binder and a mixture of 25A grade electrocorundum of 220 fraction and a mixture of 53C grade silicon carbide is used as an additional mixture with the following mixing ratio of the components, according to FEPA 32 GB 1971, % wt:

for 53C grade silicon carbide thermconductive concrete, according to FEPA 32 GB 1971, % wt:
25A grade electrocorundum—25-35% wt of 220 fraction
53C grade silicon carbide SiC—32-36% wt of 20 fraction 18-24% wt fraction 46-15-20% wt of 80 fraction
Orthophosphoric acid with a concentration of 70%, amounting to 10-12 in addition to 100% wt.
25A grade electrocorundum—particle range (μm) 28-80, main 50-63, FEPA compliant—F220.
53C grade silicon carbide—particle range 1250-1000, FEPA compliant—F20.
53C grade silicon carbide—particle range 500-315, FEPA compliant—F46.
53C grade silicon carbide—particle range 200-160, FEPA compliant—F80.

Methods for concrete production based on aluminophosphate binder are the same for all claimed compositions. A mixture of filler containing the claimed fractions and orthophosphoric acid with a concentration of 70% are mixed until homogeneous and then are filled into molds. Subsequent low-temperature firing builds strong refractory concrete products based on aluminophosphate binder made of crystalline aluminum phosphate.

Table 1 shows thermoinsulative nonconductive corundum concretes. Concrete data at a temperature of +1000° C.

Table 2 shows thermoconductive nonconductive concretes. Concrete data at a temperature of +1000° C.

Fractional composition of concrete largely determines its thermal and strength characteristics which depend on the packing density of the filler grains of the mixture in bulk. For the same fire resistance of corundum concrete based on aluminophosphate binder (Table 1), thermoinsulative concrete in Composition 1 has the minimum required strength, medium porosity, and high thermal conductivity for refractories. Concrete in Composition 3 shows comparable characteristics with higher porosity. Thermophysical and strength characteristics for concrete in Composition 2 are close to optimal. They show high incombustibility, maximum strength, minimum thermoconductivity and porosity.

Depending on the composition, silicon carbide compositions based on aluminophosphate binder show similar characteristics (Table 2). At the same fire resistance, concrete in Composition 1 has a lower strength and lower thermoconductivity. Concrete in Composition 3 shows similar characteristics. Thermophysical and strength characteristics for concrete in Composition 2 are close to optimal. They show high incombustibility, maximum strength and thermoconductivity, and minimum porosity.

TABLE 1

Table 1. Thermoinsulative nonconductive corundum concretes

| Electrocorundum fractional composition | Composition 1, % wt | Composition 2, % wt | Composition 3, % wt |
|---|---|---|---|
| FEPA 20 | 28 | 32 | 36 |
| FEPA 46 | 22 | 23 | 24 |
| FEPA 80 | 15 | 17 | 20 |
| FEPA 220 | 25 | 30 | 35 |
| Orthophosphoric acid in addition to 100% | 10 | 11 | 12 |
| Compression resistance*) | 68 MPa | 75 MPa | 70 MPa |
| Porosity, %*) | 14 | 8 | 18 |
| Incombustibility, ° C.*) | 1800 | 1800 | 1800 |
| Thermal conductivity, $B_T/(M \cdot \kappa)$*) | 0.43 | 0.24 | 0.43 |
| Electrical conductivity*) | dielectric | dielectric | dielectric |

*)concrete data at a temperature of +1000° C.

TABLE 2

Table 2. Thermally nonconductive concretes

| Fractional composition | Composition 1, % wt | Composition 2, wt % | Composition 3, % wt |
|---|---|---|---|
| Silicon carbide FEPA 20 | 32 | 34 | 36 |
| Silicon carbide FEPA 46 | 18 | 19 | 24 |
| Silicon carbide FEPA 80 | 15 | 17 | 20 |
| Electrocorundum FEPA 220 | 25 | 30 | 35 |
| Orthophosphoric acid in addition to 100% | 10 | 11 | 12 |
| Compression resistance*) | 64 MPa | 75 MPa | 68 MPa |
| Porosity, %*) | 12 | 8 | 24 |
| Incombustibility, ° C.*) | 1100 | 1100 | 1100 |
| Thermal conductivity, $B_T/(M \cdot \kappa)$*) | 21 | 26 | 18 |
| Electrical conductivity*) | dielectric | dielectric | dielectric |

*)concrete data at a temperature of +1000° C.

INDUSTRIAL APPLICABILITY

The claimed thermoconductive and thermoinsulative concretes based on aluminophosphate binder possess high strength characteristics, which allow their use as construction materials operating at high temperatures.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A thermoinsulative concrete based on an aluminophosphate binder including a phosphate binder and a mixture, wherein an orthophosphoric acid is added in a concentration of 65-75% as the phosphate binder and a mixture of fractions of an electrocorundum is added as the mixture with the following mixing ratio of the components, according to % of wt:
   - 28-36% by wt of the electrocorundum with particle size in a range (μm) of 630-1600;
   - 22-24% by wt of the electrocorundum with particle size in a range (μm) of 200-500;
   - 15-20% by wt of the electrocorundum with particle size in a range (μm) of 100-250;
   - 25-35% by wt of the electrocorundum with particle size in a range (μm) of 28-80; and
   - 10-12% of the orthophosphoric acid in addition to 100% wt.

2. A thermoconductive concrete based on an aluminophosphate binder comprises a phosphate binder and a mixture, wherein an orthophosphoric acid in a concentration of 65-75% is added as the phosphate binder, a mixture of an electrocorundum and a mixture of a silicon carbide is added as an additional mixture with the following mixing ratio of the components, according to % of wt:
   - 25-35% by wt of the electrocorundum fraction with particle size in a range (μm) of 28-80;
   - 32-36% by wt of the silicon carbide fraction with particle size in a range (μm) of 1250-1000;
   - 18-24% by wt of the silicon carbide fraction with particle size in a range (μm) of 500-315;
   - 15-20% by wt of fraction with particle size in a range (μm) of 180-212;
   - orthophosphoric acid—10-12% of the orthophosphoric acid in addition to 100% wt.

* * * * *